Aug. 7, 1956  E. D. LYTLE  2,758,255
POLYPHASE MOTOR PROTECTOR
Filed Nov. 24, 1951  2 Sheets—Sheet 1

ELVIN D. LYTLE,
INVENTOR.

BY John H. T. Wallace

ELVIN D. LYTLE,
INVENTOR.

United States Patent Office 2,758,255
Patented Aug. 7, 1956

2,758,255
POLYPHASE MOTOR PROTECTOR

Elvin D. Lytle, Los Angeles, Calif., assignor to The Garrett Corporation, Los Angeles, Calif., a corporation of California Application November 24, 1951, Serial No. 257,996

7 Claims. (Cl. 317—13)

This invention relates to protection of polyphase load devices, and particularly relates to a method and means for thermal protection of such devices. This application is a continuation-in-part of my application Serial No. 85,212, filed April 2, 1949, now abandoned.

It is a general object of this invention to protect polyphase load devices against undesirable thermal conditions obtaining therein.

In order to provide both single- and three-phase alternating current it is common practice, particularly on aircraft, to bring off another lead from the common connection of the three phase-legs of a Y-connected alternator or transformer. For convenience it is not uncommon practice to ground this fourth lead, for example, to the aircraft frame, this ground then constituting one power lead for the single-phase equipment. This additional lead connection further provides a source of power in the event that one or two of the three main power leads to the equipment become open. Thus, in combat aircraft where the possibility of power lead rupture by enemy gun fire exists there is the added advantage to be obtained in the ability of the equipment to operate under "double-phasing" conditions if one of the main power leads is broken by gun fire. And, even if two leads are ruptured, motors then on the line will continue to operate by single phasing.

It is an object to utilize this additional fourth lead of such a polyphase load device in a novel circuit to achieve complete thermal protection for such a device in a manner not known or taught in the prior art.

Thermal protection of single-phase load devices, wherein a thermal protector of the thermostatic type is preferably but not necessarily mounted adjacent the device, is well-known in the art. Likewise, Patent No. 2,467,862 for Polyphase Motor Protective Means, issued April 19, 1949, to R. E. Seely, discloses means for providing partial protection for polyphase devices. However, complete thermal protection for all phase legs of a polyphase device by a thermostat mounted adjacent to the device has not been satisfactorily solved hitherto, since polyphase devices present problems not inherent with single-phase devices.

It is a further object to provide a method of complete thermal protection for a polyphase load device by means of thermostatic type protectors of a type well-known in the art of single-phase protectors.

Known thermal protectors of single-phase devices mounted adjacent the device to be protected afford protection against undesirable temperature rise as well as against overload currents. However, polyphase load devices present an additional problem in that one power leg of the device may be opened (by a blown fuse, for example) and the device may continue to function by "single-phasing" or "double-phasing." This condition may be undesirable in that even though the device may not be operating at full load with respect to three phases, it may be overloaded insofar as the one or two active phases is concerned, and the windings of the device may heat up rapidly and be damaged before the motor heat actuates the thermal protector. It is therefore an object of the invention to provide thermal protection of a polyphase device against "single-" or "double-phasing," in addition to providing protection against over-heating of the motor and against overload current in one or two phases.

Additional objects will be apparent upon consideration of my description and drawing of methods of utilizing the invention when applied to a 3-phase alternating current motor, but it will be appreciated by those skilled in the art that the invention's utility is not limited thereto, and it is not my intent to so-limit the invention to the preferred embodiments disclosed herein.

Referring to drawings wherein like reference numerals indicate like parts,

Figure 1:
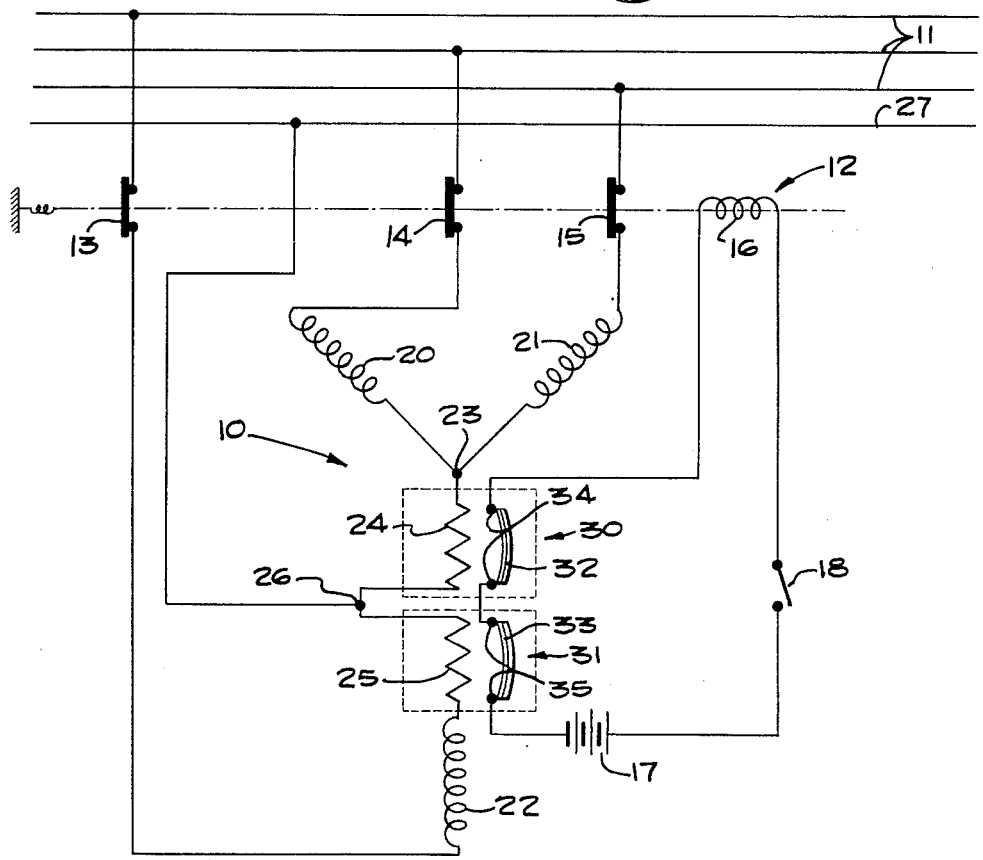
Fig. 1, shows a circuit diagram of a 3-phase Y-connected motor employing thermostatic protection in the preferred embodiment of my invention.

In Fig. 1 a three-phase motor 10 is shown connected to main power leads 11 through a contactor or relay 12, comprising switch contacts 13, 14, and 15 operated by an electromagnet coil 16 which is connected to a battery 17, or other source of control current, through a switch 18. The control current may, of course be supplied from any convenient alternating current source, if desired. The three windings 20, 21, and 22 of motor 10 are Y-connected, one end of each of windings 20 and 21 being joined at a common connection point 23 to which one end of winding 22 is connected through electric heaters 24 and 25, the purpose of which will be hereinafter described. The heaters 24 and 25 are joined at point 26 with the additional fourth lead 27 of the power source. The heaters 24 and 25 form a part of thermostatic switches 30 and 31, respectively, which are usually mounted adjacent motor 10 for thermal and overload protection thereof.

The particular design of the thermostatic switch used as an overload protector is not a part of this invention, and any of the common forms can be used; for example, either those employing a bi-metallic strip, or those employing a snap-acting bi-metallic disc such as shown in United States Patents 2,199,387 and 2,199,388 to John D. Bolesky. Briefly described, a switch of this latter type comprises an electrical insulating base on which is mounted a snap-acting bi-metallic disc of the type shown and described in United States Patent 1,448,240 to John A. Spencer. Contact buttons are welded to the snap-acting discs 32 and 33 at diametrically opposite points on their peripheries. These contact buttons cooperate with stationary contacts 34 and 35, respectively, mounted on the thermostat bases (not shown), to open or close an electrical circuit as either or both of the discs are snapped from one position of convexity to the oppositely curved position when heated or cooled, the said electrical circuit also comprising the series connected coil 16, battery 17, and switch 18. The heaters 24 and 25 are so positioned with respect to thermostatic discs 32 and 33 as to be in heat transfer relation thereto.

Since it is intended that the thermostatic switches 30 and 31 be mounted adjacent to the motor, it is apparent that the bi-metallic discs 32 and 33 will react to the heat of the motor and/or the heat from the electric heaters 24 and 25. If desired, however, the switches 30 and 31 may be mounted at any point remote from the motor, in which event the discs 32 and 33 will react only to the heat of heaters 24 and 25.

Considering the action of the thermostatic switches 30 and 31, it will be seen that the current flowing in winding 22 is the only current to normally flow through heaters 24 and 25, since no current normally flows through lead 27 when all three phases are energized and balanced, and said current in winding 22 is not sufficient to trip discs 32 and 33 when motor 10 is normally loaded. If the power lead to winding 22 is opened the motor will double-phase by virtue of the power drawn by windings 20 and 21 from the power leads and from additional lead 27. When the phase of winding 22 is opened the vector sum of the current in windings 20 and 21, which is essentially equal to that in either one of these windings, will flow to lead 27 through the heater 24. When the load on the motor is such as to cause an additional and destructive current in the windings the additional current required causes heater 24 to actuate disc 32 in the thermostatic switch 30, thereby opening the circuit to magnet coil 16.

Now assume that winding 20 instead of winding 22 opens, thereby causing the motor to double-phase on windings 21 and 22. It is seen that the current in the heater 24 is now the current in winding 21 and the current in heater 25 is the current in winding 22, and when the load on the motor requires additional destructive current the additional current in either heater 24 or 25 will likewise actuate the disc 32 or 33, thereby opening the circuit to magnet coil 16. A like condition obtains if winding 21 opens and the motor double-phases on windings 20 and 22.

The thermostatic switches 30 and 31 will also protect motor 10 in all conditions of single-phasing. Assuming that the windings 21 and 22 are deenergized while the motor 10 is running, the motor will then single-phase on winding 20, the current therein flowing through heater 24 to the additional lead 27. When such current becomes destructive the thermostatic switch 30 will open the contactor or relay 12. A like condition obtains if windings 20 and 22 open and the motor single-phases on winding 21. Also, if windings 20 and 21 open, and the motor single-phases on winding 22, in that event a destructive current will cause thermostatic switch 31 to deenergize relay 12.

Figure 2:
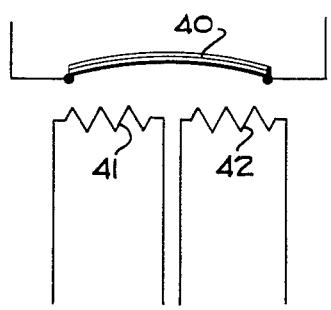
Fig. 2 shows a protector having a single thermostatic element subject to heating by a plurality of heaters.

Referring to Fig. 2, there is shown a single thermostatic switch having heaters 41 and 52 which may be connected as shown in Fig. 1. In this instance, a bi-metallic disc 40 is subject to thermal effects from both heaters. In the construction shown it is seen that when a single heater is carrying load current there will be a requirement of about 41.4% more current to actuate the disc 40 than that required when both heaters carry the load current. Such a condition might be desirable in electric motors where single-phasing operation is required under emergency circumstances short of complete burn-out of its windings. Under such a condition the disc 40 would be subject to the relatively gradual rise of motor temperature, and would likewise be sensitive to highly destructive currents in either of the heaters 41 or 42. The disc would also respond to normal current overload in both heaters. It will be noted that when a three-phase motor is single-phasing, the allowable added load on the windings of that working phase may be somewhat greater than might be expected since heat transfer from those windings may take place at a greater rate than when the adjacent windings are loaded and contributing to heat rise within the motor.

Figure 3:
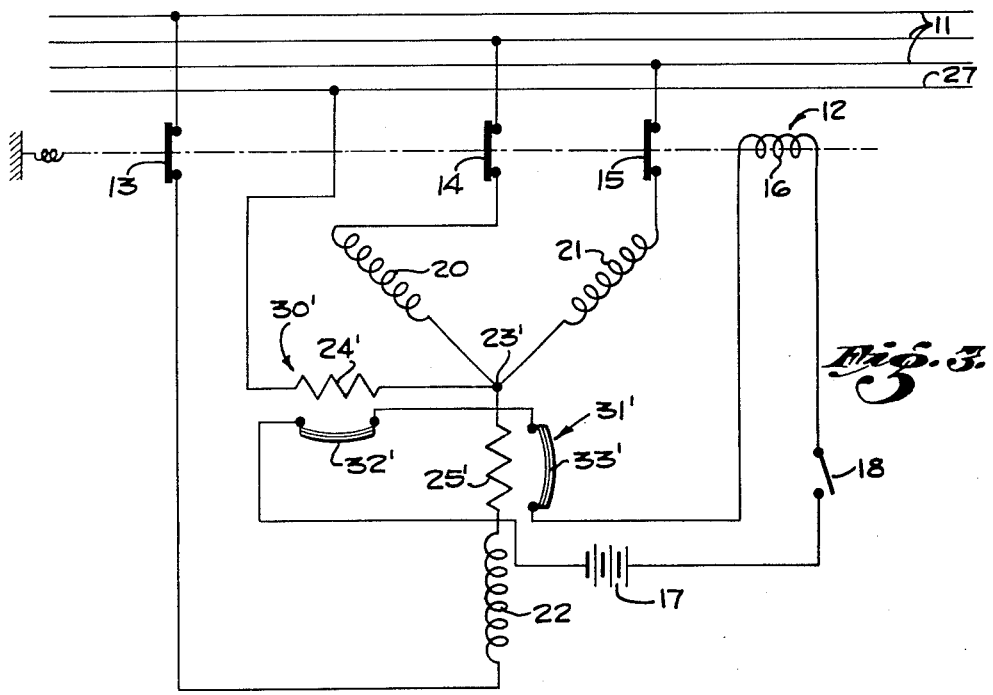
Fig. 3 shows another embodiment of my invention.
Figure 4:
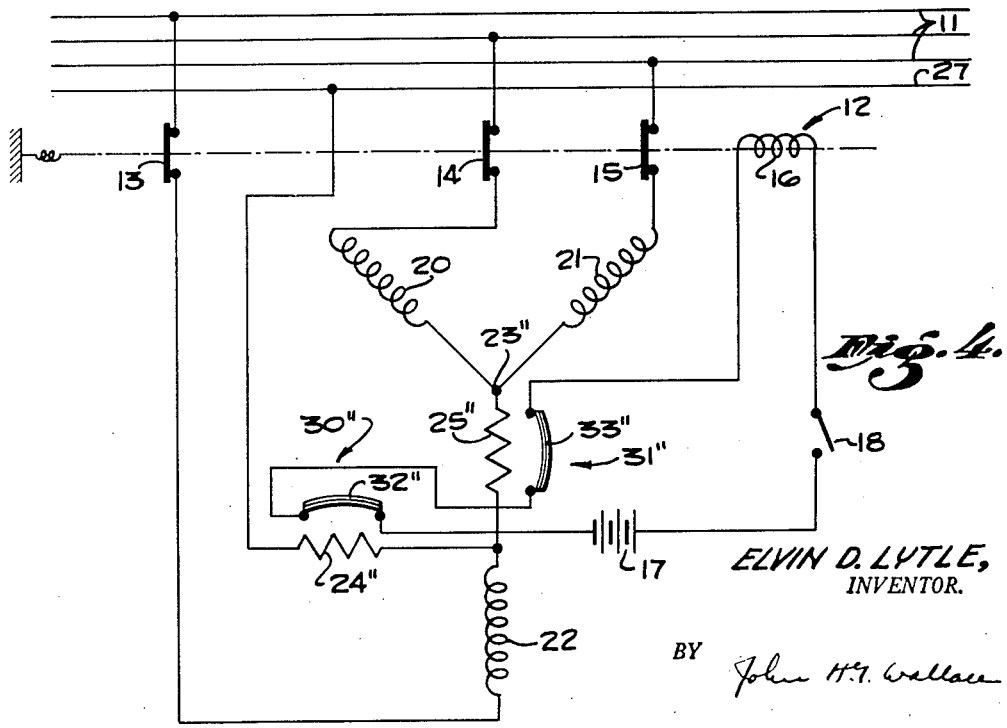
Fig. 4 shows yet another embodiment.

In Figs. 3 and 4 I have shown alternate means for connecting a plurality of thermostatic switch heaters for thermal protection of a polyphase device. The windings 20, 21 and 22 of Fig. 3 are connected through switch contacts 13, 14, and 15 to main power leads 11, same as in Fig. 1. Also, the contacts of the bi-metallic discs 32 and 33 connect the coil 16 of the relay 12 to the battery 17 to hold the switch contacts 13, 14, and 15 in the closed position. In the embodiment of Fig. 3, however, the heater 24' is connected into a series circuit including the additional power lead 27, and the point 23' which is common to the windings 20 and 21 and the heater 25', which latter is in series between the point 23' and winding 22.

In Fig. 4 the energizing circuit of relay 12 is the same as that of Figs. 1 and 3, as are the power connections from windings 20, 21, and 22 to the power leads 11. The heater 24", however, is connected in the series circuit including the additional power lead 27 and a point which is common to the winding 22 and the heater 25", the latter being in series between winding 22 and the common connection point 23" the same as in Fig. 3.

In both Figs. 3 and 4 the operation of the thermostatic overload protectors is identical to that in Fig. 1. The circuits of Figs. 3 and 4 may be advantageous where it is desired that power loss within the thermostat heaters be kept at a minimum. Thus, heaters 24' and 24" carry little or no current when the motors are functioning normally.

While the switches 30 and 31 of Fig. 1 have been shown as separate units, it will be appreciated that they may be combined into a single unitary device according to requirements and for the sake of simplicity.

Likewise, in Figs. 1, 3, and 4 the power source for the control circuit is shown as a battery 17, but it will be appreciated that any convenient means may be utilized provided that switches 30, 31, 30', 31', 30", and 31" cooperate with such means in a manner to open contactor 12 upon the advent of undesirable conditions obtaining due to overheating of the motor or to excessive and destructive currents in any of the windings thereof.

I claim:

1. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, one of said heater means being in series with said additional lead, said one of said heater means thereby providing protection in the event of one or more undesirable thermal conditions, another of said plurality of heater means being in series with one of said windings and providing protection in the event of further or other undesirable thermal conditions in said device, said heater means thereby providing protection in any undesirable thermal condition arising out of single- or double-phase operation of said device.

2. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, one of said heater means being connected in series with said additional lead through one of said windings to one of the phases of said polyphase supply source, said one of said heater means thereby providing protection in the event of one or more undesirable thermal conditions, and another of said plurality of heater means being in series with one of said windings providing protection in the event of further or other undesirable thermal conditions in said device, said heater means thereby providing protection in any undesirable thermal condition arising out of single- or double-phase operation of said device.

3. In an energizing circuit for a star connected polyphase electrical device comprising power windings for each phase connected at one end to a common star point and at the other end to their respective phase of a polyphase supply source, said circuit including an additional power lead from said source to said common star point; switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, one of said heater means being in series with said additional lead, another of said heater means being connected in series with one of said windings between said common star point and one of the phases of said polyphase supply source.

4. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, one of said heater means being in series with said additional lead between said common star point and said source for said additional lead, and another of said heater means being in series with one of said windings to one of the phases of said polyphase supply source.

5. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, said heater means being connected in series with each other and one of said windings between said common star point and one of the phases of said polyphase supply source, and said additional lead being connected to said common star point through one of said heater means.

6. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupled with said switch means for actuation thereof; and a plurality of heater means adjacent said thermostatic means, and connected in said circuit, said heater means being connected in series with each other between said common star point and said additional lead, one of the phases of said polyphase supply source being connected through one of said windings to a point common to two of said heater means.

7. In an energizing circuit for a star connected polyphase electrical device comprising power windings for each phase connected at one end to a common star point and at the other end to their respective phase of a polyphase supply source, said circuit including an additional power lead from said source to said common star point: switch means in said circuit intermediate said source and said device to disconnect said device from said polyphase supply source; thermostatic means having a connection with and coupling with said switch means for actuation thereof; and a plurality of heater means adjacent said thermostatic means, and connected in said circuit, a first one of said heater means being connected in series with said additional lead between said additional lead and said common star point, and a second one of said heater means being connected in series with one of said windings between said common star point and one of the phases of said polyphase supply source.

References Cited in the file of this patent

UNITED STATES PATENTS

| Re. 22,973 | Kurtz | Feb. 10, 1948 |
| 1,721,409 | Pohl | July 16, 1929 |
| 1,731,971 | Courtin et al. | Oct. 15, 1929 |
| 2,085,116 | McShane | June 29, 1937 |
| 2,304,599 | Rigby | Dec. 8, 1942 |
| 2,358,215 | Darling | Sept. 12, 1944 |
| 2,467,862 | Seely | Apr. 19, 1949 |
| 2,607,831 | Jones | Aug. 19, 1952 |